(12) United States Patent
Smeltzer

(10) Patent No.: US 7,096,823 B1
(45) Date of Patent: Aug. 29, 2006

(54) PET WASTE COLLECTION APPARATUS

(76) Inventor: Michael Smeltzer, 838 S. Weldon, Beulah, MI (US) 49617

( * ) Notice: Subject to any disclaimer, the term of this patent is extended or adjusted under 35 U.S.C. 154(b) by 136 days.

(21) Appl. No.: 10/928,960

(22) Filed: Aug. 30, 2004

(51) Int. Cl.
*A01K 29/00* (2006.01)
(52) U.S. Cl. .................................. 119/166; 119/161
(58) Field of Classification Search ............... 119/161, 119/165, 166, 168–170
See application file for complete search history.

(56) References Cited

U.S. PATENT DOCUMENTS

| | | | |
|---|---|---|---|
| 1,813,329 A | 7/1931 | Supplee | |
| 2,963,003 A * | 12/1960 | Oberg et al. | 119/166 |
| 3,476,083 A * | 11/1969 | Vander Wall | 119/166 |
| 3,734,057 A | 5/1973 | Lee et al. | |
| 3,752,121 A * | 8/1973 | Brazzell | 119/169 |
| 3,818,865 A * | 6/1974 | Sinclair | 119/161 |
| 3,842,803 A | 10/1974 | Temel | |
| 4,469,046 A * | 9/1984 | Yananton | 119/169 |
| 4,972,800 A * | 11/1990 | Bennett et al. | 119/166 |
| 5,148,771 A | 9/1992 | Schuett et al. | |
| 5,293,837 A * | 3/1994 | Caldwell | 119/166 |
| 5,353,743 A * | 10/1994 | Walton | 119/166 |
| 5,598,811 A * | 2/1997 | Merchant | 119/166 |
| 5,755,181 A | 5/1998 | Petkovski | |
| 6,745,719 B1 * | 6/2004 | Howerton | 119/166 |
| 2006/0037548 A1 * | 2/2006 | Mohr | 119/166 |

\* cited by examiner

*Primary Examiner*—Teri Pham Luu
*Assistant Examiner*—Kimberly S. Smith

(57) ABSTRACT

A portable apparatus for collecting pet feces includes a basin having oppositely spaced edge portions, a planar bottom surface and a pair of oppositely disposed flange portions protruding outwardly. A housing is mounted on top of the basin and includes integral and opaque sidewalls protruding upwardly from the basin. One sidewall has a passageway formed therein. The housing further includes a grass-like top layer positionable on a mesh-like bottom layer. The apparatus further includes wire handles having lower end portions positionable below the top layer and engageable therewith and top end portions protruding upwardly from the sidewalls. The sidewalls allow a user to maintain a substantially stable grip of the top layer when removing the solid feces during non-operating conditions. The handle lower end portions have generally L-shapes for traversing upwardly and rearwardly through the bottom layer.

15 Claims, 3 Drawing Sheets

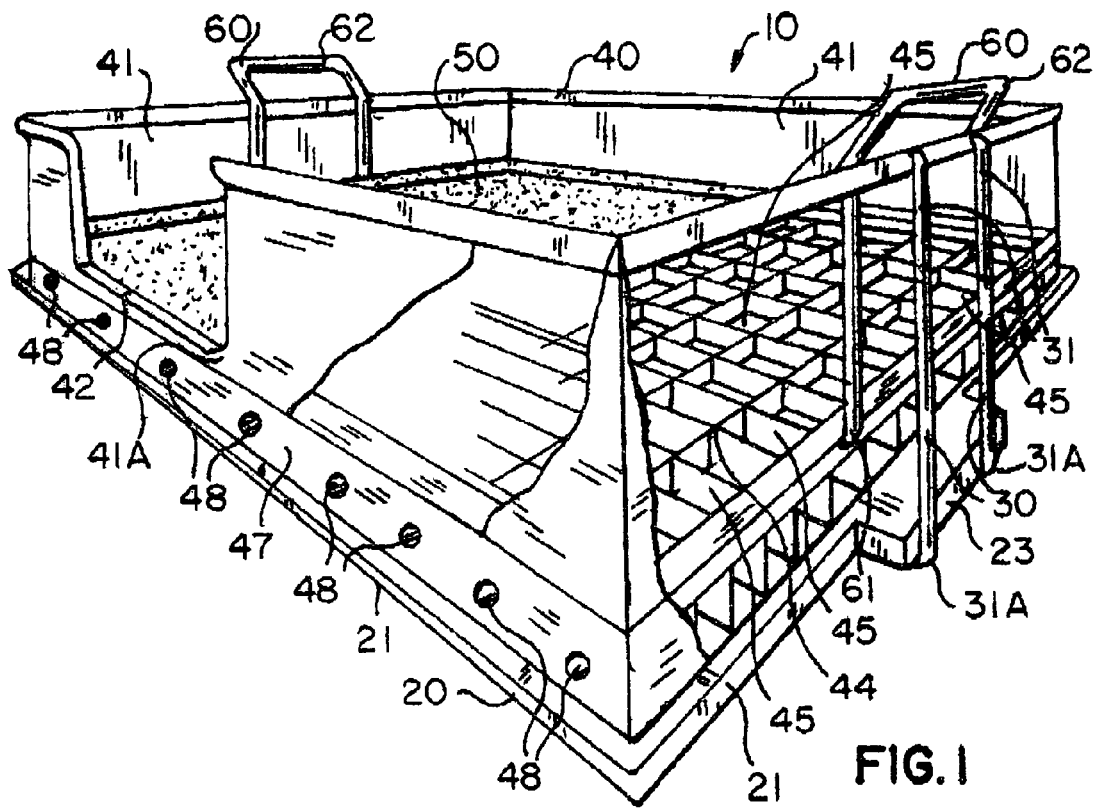
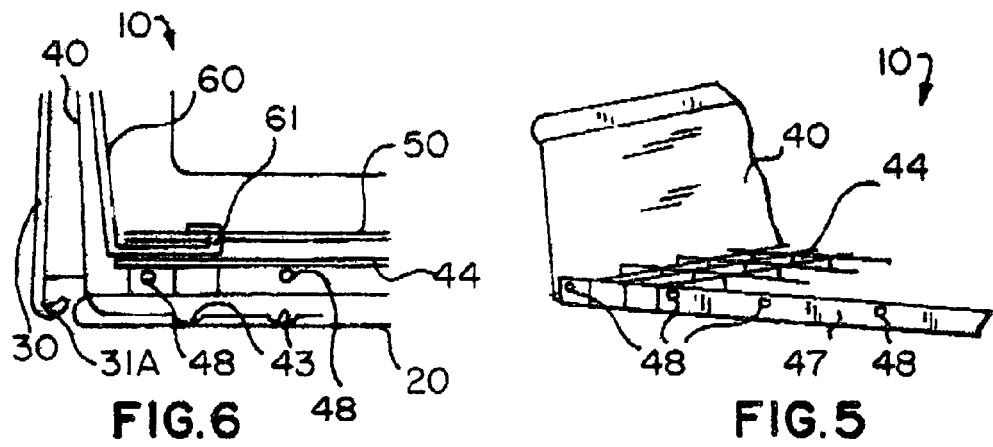

PET WASTE COLLECTION APPARATUS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a waste collection apparatus and, more particularly, to a pet waste collection apparatus for collecting pet feces.

2. Prior Art

With the enactment of laws in many locations requiring owners to remove from the streets and sidewalks solid wastes left by pets, the amount of distasteful work involved in keeping pets has increased. Thus, there is a well recognized need for accommodating pets, especially dogs, to defecate. This is true not only in large cities but also in smaller ones as well.

It is known that there are some pet toilets in which entry of the pet onto an upwardly biased treadle forces the treadle to a level position which, in turn, conditions a valve actuation arrangement for opening a control valve when the pet leaves. When the pet steps off the toilet, the treadle returns to its upwardly inclined position whereby control of the valve is opened and a large volume of water flushes down the treadle.

Some pet toilets activate via an electronic sensing means. After the animal leaves, a sensor detects that a platform has returned to its normal level and water is automatically introduced to a level of the platform. An ultrasonic transducer emits ultrasonic waves which clear the platform and other areas of the pet toilet.

The prior art has several limitations. In some cases, the prior art is not connected to the home's conventional plumbing system and this can cause the need for human intervention in order to properly clean the device. In other cases, the device's structure is such that it limits the size of the pet, so that only smaller animals can use the device. In still other prior art toilets, a timing device could cause the toilet to flush while in use or a malfunction of moveable flooring, upon flushing, could injure the pet.

Accordingly, a need remains for an improved pet toilet which overcomes these disadvantages. The present invention is very convenient for use in the home, and the flushing and cleaning are carried out automatically.

BRIEF SUMMARY OF THE INVENTION

In view of the foregoing background, it is therefore an object of the present invention to provide an apparatus for pet waste collection. These and other objects, features, and advantages of the invention are provided by a portable apparatus for collecting pet feces.

The apparatus includes a basin having a centrally disposed longitudinal axis and oppositely spaced edge portions extending substantially parallel thereto. Such a basin further has a planar bottom surface for advantageously receiving and storing fluid feces therein. The basin includes a pair of oppositely disposed flange portions integral therewith and protruding outwardly along a horizontal plane so that a user can conveniently transport the basin between remote locations. The apparatus further includes a plurality of elongated fastening members having opposed end portions secured to the housing (described herein below) and removably connectable to the basin wherein one of the end portions has a substantially arcuate shape for hooking beneath the flange portions respectively.

A housing is removably mounted on top of the basin and is sized and shaped for being intermediately situated along the axis. Such a housing includes a plurality of integral and opaque sidewalls protruding upwardly from the basin and terminating vertically thereabove at a predetermined height. One of the sidewalls has a passageway formed therein for allowing a pet to conveniently access the apparatus as desired. The housing preferably has a lower perimeter portion provided with a plurality of selectively spaced ribs angled downwardly from the sidewalls. Such ribs are in fluid communication with the partitions for effectively directing fluid feces into the basin.

The housing also includes a mesh-like bottom layer, preferably coated with a non-corrosive material, defining a plurality of symmetrically oriented partitions for effectively allowing fluid feces to pass downwardly therethrough and into the basin. This isolates and maintains the solid feces thereabove so that a user can readily dispose of the solid feces without separating the basin from the housing. Such partitions have generally rectangular shapes. The bottom layer preferably has opposed end corners defining a plurality of passageways for effectively channeling fluid feces distally from the axis.

The bottom layer preferably further has an outer perimeter wall provided with a plurality of conduits for advantageously channeling the fluid feces outwardly and away from the housing. Such conduits are spaced about the perimeter wall in equidistant intervals and further are vertically offset from the basin so that a predetermined volume of the fluid feces can be effectively collected therein. A grass-like top layer, preferably including a resilient material such as ASTRO-TURF (synthetic grass), is selectively positionable on the bottom layer and cooperates therewith for providing a suitable surface onto which the pet may traverse during operating conditions.

The present invention further includes a plurality of wire handles having lower end portions adjustably positionable below the top layer and engageable therewith. Such handles further include top end portions protruding upwardly from the sidewalls and terminating at an exterior of the housing for advantageously allowing a user to maintain a substantially stable grip of the top layer when removing the solid feces during non-operating conditions. The handle lower end portions have generally L-shapes for traversing upwardly and rearwardly through the bottom layer.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a perspective view showing an apparatus for providing a pet waste collection apparatus, in accordance with the present invention;

FIG. 5 is a perspective view showing the bottom layer and the plurality of conduits; and FIG. 6 is a cross-sectional view showing the angled ribs and the wire handles.

DETAILED DESCRIPTION OF THE INVENTION

Figure 2:
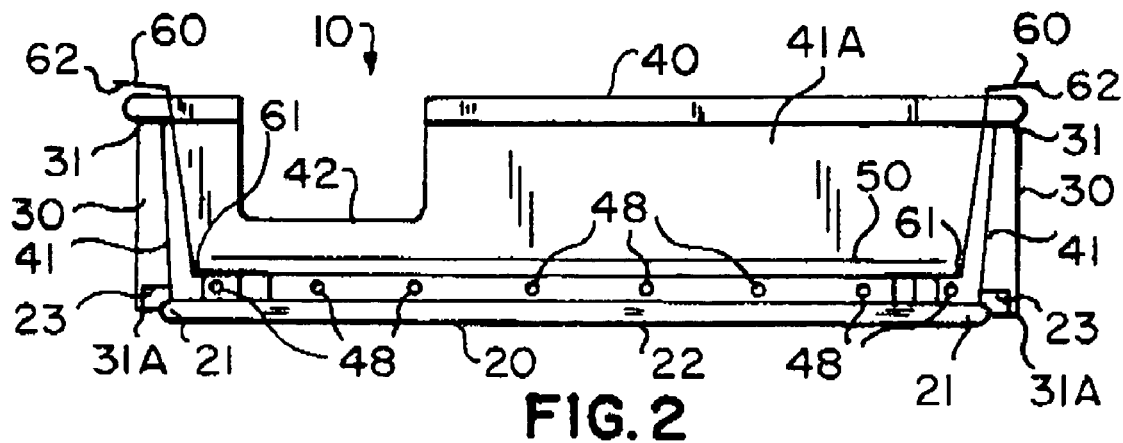
FIG. 2 is a side elevational view of the apparatus shown in FIG. 1.
Figure 3:
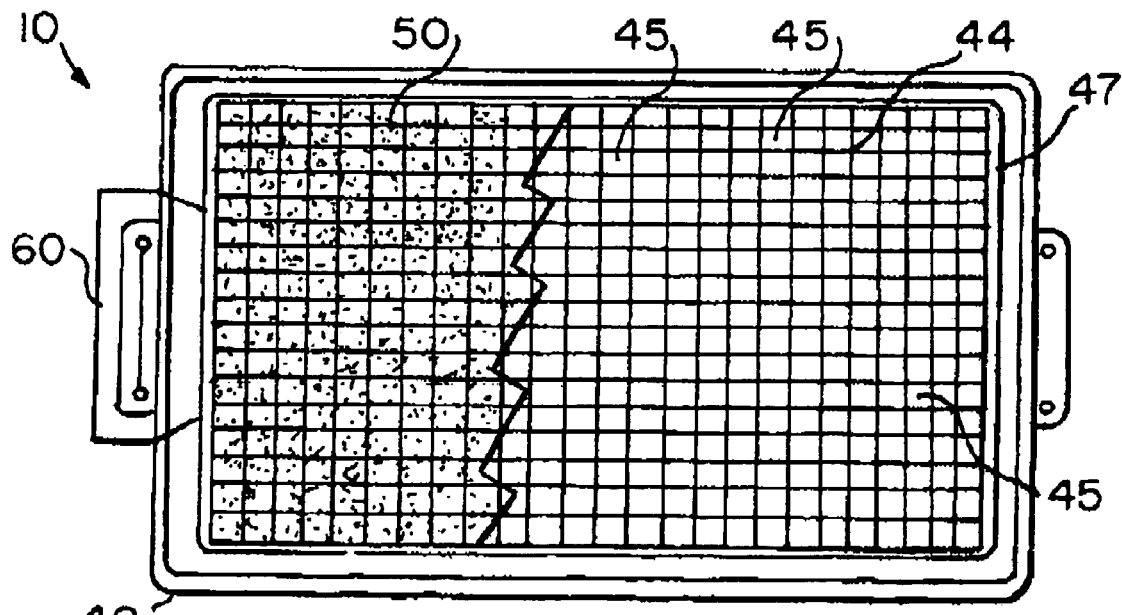
FIG. 3 is a top plan view of the apparatus shown in FIG. 2.
Figure 4:
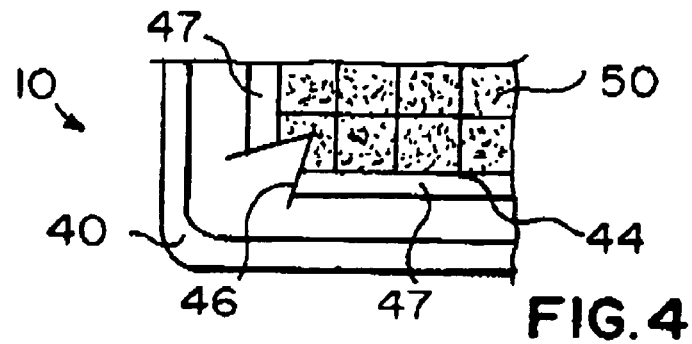
FIG. 4 is an enlarged top plan view of the apparatus' corner section shown in FIG. 3 with the passageway formed therein.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–4 by the reference numeral 10 and is intended to provide a pet waste collection apparatus. It should be understood that the apparatus 10 may be used to collect many different types of pet wastes and should not be limited to only cats.

Referring initially to FIG. 1, the apparatus 10 includes a basin 20 having a centrally disposed longitudinal axis and oppositely spaced edge portions 21 extending substantially parallel thereto. Such a basin 20 further has a planar bottom surface 22 for advantageously receiving and storing fluid feces therein. The basin 20 includes a pair of oppositely disposed flange portions 23 integral therewith and protruding outwardly along a horizontal plane so that a user can conveniently transport the basin 20 between remote locations when the basin 20 needs emptying.

The apparatus 10 further includes a plurality of elongated fastening members 30 having opposed end portions 31 secured to the housing 40 (described herein below) and removably connectable to the basin 20 wherein one of the end portions 31a has a substantially arcuate shape for hooking beneath the flange portions 23 respectively. Such a plurality of fastening members 30 effectively prevent the housing 40 from disengaging the basin 20 during operating conditions, conveniently allowing pets of larger size to use the apparatus 10 without fear of the aforementioned occurring.

A housing 40 is removably mounted on top of the basin 20 and is sized and shaped for being intermediately situated along the axis. Such a housing 40 includes a plurality of integral and opaque sidewalls 41 protruding upwardly from the basin 20 and terminating vertically thereabove at a predetermined height. One of the sidewalls 41a has a passageway 42 formed therein for allowing a pet to conveniently access the apparatus 10 as desired. Such a passageway 42 advantageously allows older pets lacking the strength to lift their limbs over the sidewalls 41 to gain access to the apparatus 10. The housing 40 has a lower perimeter portion provided with a plurality of selectively spaced ribs 43 angled downwardly from the sidewalls 41. Such ribs 43 are in fluid communication with the partitions 45 (described herein below) for effectively directing fluid feces into the basin 20.

The housing 40 also includes a mesh-like bottom layer 44, coated with a non-corrosive material, defining a plurality of symmetrically oriented partitions 45 for effectively allowing fluid feces to pass downwardly therethrough and into the basin 20. This isolates and maintains the solid feces thereabove so that a user can readily dispose of the solid feces without separating the basin 20 from the housing 40. Such partitions 45 have generally rectangular shapes. The bottom layer 44 has opposed end corners defining a plurality of passageways 46 for effectively channeling fluid feces distally from the axis.

Figure 6A:
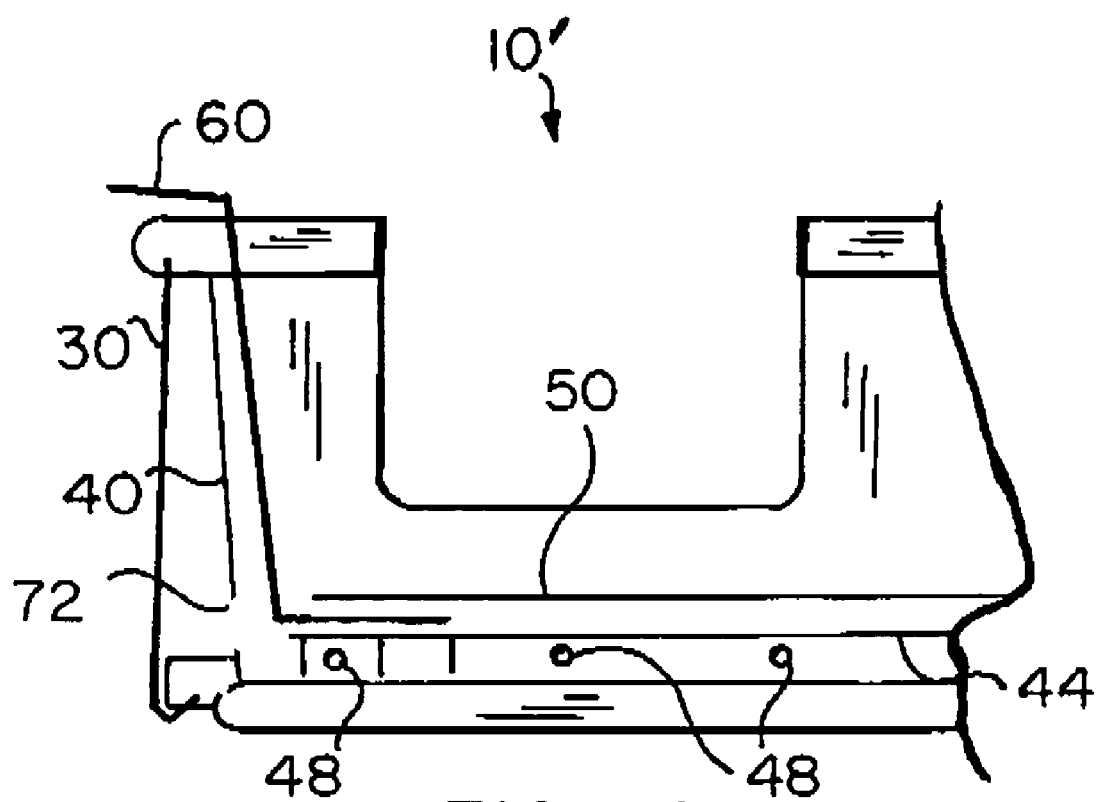
FIG. 6A is a cross-sectional view of an alternate embodiment provided with large holes for promoting further drainage from the housing.

The bottom layer 44 further has an outer perimeter wall 47 provided with a plurality of conduits 48 for advantageously channeling the fluid feces outwardly and away from the housing 40, thereby maintaining the cleanliness of the housing. This makes it more pleasant for the pet to reuse and prevents unpleasant odors. Such conduits 48 are spaced about the perimeter wall 47 in equidistant intervals and further are vertically offset from the basin 20 so that a predetermined volume of the fluid feces can effectively be collected therein. A grass-like top layer 50, including a resilient material such as ASTRO-TURF (synthetic grass), is selectively positionable on the bottom layer 44 and cooperates therewith for providing a suitable surface onto which the pet may traverse during operating conditions. Referring to FIG. 6A, an alternate embodiment 10' is shown wherein an enlarged drainage hole 72 is formed in a corner of the outer perimeter wall 47 and spaced above the conduits 48 for further discharging fluids and debris away from the housing 40. Such a drainage hole 72 preferably has a diameter up to four times larger than a diameter of the conduits 48 for facilitating drainage of the housing 40. Of course, such drainage holes 72 may be positioned at all four corners of the housing 40, as well known to one skilled in the art.

The present invention further includes a plurality of wire handles 60 having lower end portions 61 adjustably positionable below the top layer 50 and engageable therewith. Such handles 60 further have top end portions 62 protruding upwardly from the sidewalls 41 and terminating at an exterior of the housing 40 for advantageously allowing a user to maintain a substantially stable grip of the top layer 50 when removing the solid feces during non-operating conditions. The handle lower end portions 61 have generally L-shapes for traversing upwardly and rearwardly through the bottom layer 44. Such handles 60 advantageously eliminate the need for a pet owner to dispose of the solid feces by hand.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of opera-

What is claimed as new and what is desired to secure by Letters Patent of the United States is:

1. A portable apparatus for collecting pet feces, said apparatus comprising:
a basin having a centrally disposed longitudinal axis and oppositely spaced edge portions extending substantially parallel thereto, said basin further having a planar bottom surface for receiving and storing fluid feces therein, said basin including a pair of oppositely disposed flange portions integral therewith and protruding outwardly along a horizontal plane so that a user can readily transport said basin between remote locations; and
a housing removably mounted on top of said basin and being sized and shaped for being intermediately situated along the axis, said housing including a plurality of integral sidewalls protruding upwardly from said basin and terminating vertically thereabove at a predetermined height, one said sidewalls having a passageway formed therein for allowing a pet to access said apparatus as desired, said housing comprising
a mesh-like bottom layer defining a plurality of symmetrically oriented partitions for allowing fluid feces to pass downwardly therethrough and into said basin while isolating and maintaining solid feces thereabove so that a user can readily dispose of the solid feces without necessitating the separation of said basin from said housing,
a grass-like top layer selectively positionable on said bottom layer and cooperating therewith for providing a suitable surface onto which the pet may traverse during operating conditions, and
a plurality of handles having lower end portions adjustably positionable below said top layer and engageable therewith, said handles further having top end portions protruding upwardly from said sidewalls and terminating exterior of said housing for allowing a user to maintain a substantially stable grip of said top layer when removing the solid feces during non-operating conditions;
wherein said bottom layer further has an outer perimeter wall provided with a plurality of conduits for channeling the fluid feces outwardly and away from said housing, said conduits being spaced about the perimeter wall in equidistant intervals and further being vertically offset from said basin so that a predetermined volume of the fluid feces can be collected therein.

2. The apparatus of claim 1, wherein said housing has a lower perimeter portion provided with a plurality of selectively spaced ribs angled downwardly from said sidewalls, said ribs being in fluid communication with said partitions for directing fluid feces into said basin.

3. The apparatus of claim 1, wherein said bottom layer is coated with non-corrosive material and said top layer is formed from resilient material comprising synthetic grass.

4. The apparatus of claim 1, further comprising: a plurality of elongated fastening members having opposed end portions secured to said housing and removably connectable to said basin wherein one said end portions having a substantially arcuate shape for hooking beneath said flange portions respectively.

5. The apparatus of claim 1, wherein said bottom layer has opposed end corners defining a plurality of passageways for channeling fluid feces distally from the axis.

6. A portable apparatus for collecting pet feces, said apparatus comprising:
a basin having a centrally disposed longitudinal axis and oppositely spaced edge portions extending substantially parallel thereto, said basin further having a planar bottom surface for receiving and storing fluid feces therein, said basin including a pair of oppositely disposed flange portions integral therewith and protruding outwardly along a horizontal plane so that a user can readily transport said basin between remote locations; and
a housing removably mounted on top of said basin and being sized and shaped for being intermediately situated along the axis, said housing including a plurality of integral and opaque sidewalls protruding upwardly from said basin and terminating vertically thereabove at a predetermined height, one said sidewalls having a passageway formed therein for allowing a pet to access said apparatus as desired, said housing comprising
a mesh-like bottom layer defining a plurality of symmetrically oriented partitions for allowing fluid feces to pass downwardly therethrough and into said basin while isolating and maintaining solid feces thereabove so that a user can readily dispose of the solid feces without necessitating the separation of said basin from said housing, said partitions having generally rectangular shapes,
a grass-like top layer selectively positionable on said bottom layer and cooperating therewith for providing a suitable surface onto which the pet may traverse during operating conditions, and
a plurality of wire handles having lower end portions adjustably positionable below said top layer and engageable therewith, said handles further having top end portions protruding upwardly from said sidewalls and terminating exterior of said housing for allowing a user to maintain a substantially stable grip of said top layer when removing the solid feces during non-operating conditions;
wherein said bottom layer further has an outer perimeter wall provided with a plurality of conduits for channeling the fluid feces outwardly and away from said housing, said conduits being spaced about the perimeter wall in equidistant intervals and further being vertically offset from said basin so that a predetermined volume of the fluid feces can be collected therein.

7. The apparatus of claim 6, wherein said housing has a lower perimeter portion provided with a plurality of selectively spaced ribs angled downwardly from said sidewalls, said ribs being in fluid communication with said partitions for directing fluid feces into said basin.

8. The apparatus of claim 6, wherein said bottom layer is coated with non-corrosive material and said top layer is formed from resilient material comprising synthetic grass.

9. The apparatus of claim 6, further comprising: a plurality of elongated fastening members having opposed end portions secured to said housing and removably connectable to said basin wherein one said end portions having a substantially arcuate shape for hooking beneath said flange portions respectively.

10. The apparatus of claim 6, wherein said bottom layer has opposed end corners defining a plurality of passageways for channeling fluid feces distally from the axis.

11. A portable apparatus for collecting pet feces, said apparatus comprising:
a basin having a centrally disposed longitudinal axis and oppositely spaced edge portions extending substantially parallel thereto, said basin further having a planar bottom surface for receiving and storing fluid feces therein, said basin including a pair of oppositely disposed flange portions integral therewith and protruding outwardly along a horizontal plane so that a user can readily transport said basin between remote locations; and a housing removably mounted on top of said basin and being sized and shaped for being intermediately situated along the axis, said housing including a plurality of integral and opaque sidewalls protruding upwardly from said basin and terminating vertically thereabove at a predetermined height, one said sidewalls having a passageway formed therein for allowing a pet to access said apparatus as desired, said housing comprising a mesh-like bottom layer defining a plurality of symmetrically oriented partitions for allowing fluid feces to pass downwardly therethrough and into said basin while isolating and maintaining solid feces thereabove so that a user can readily dispose of the solid feces without necessitating the separation of said basin from said housing, said partitions having generally rectangular shapes, a grass-like top layer selectively positionable on said bottom layer and cooperating therewith for providing a suitable surface onto which the pet may traverse during operating conditions, and a plurality of wire handles having lower end portions adjustably positionable below said top layer and engageable therewith, said handles further having top end portions protruding upwardly from said sidewalls and terminating exterior of said housing for allowing a user to maintain a substantially stable grip of said top layer when removing the solid feces during non-operating conditions, said handle lower end portions having generally L-shaped for traversing upwardly and rearwardly through said bottom layer;

wherein said bottom layer further has an outer perimeter wall provided with a plurality of conduits for channeling the fluid feces outwardly and away from said housing, said conduits being spaced about the perimeter wall in equidistant intervals and further being vertically offset from said basin so that a predetermined volume of the fluid feces can be collected therein.

12. The apparatus of claim 11, wherein said housing has a lower perimeter portion provided with a plurality of selectively spaced ribs angled downwardly from said sidewalls, said ribs being in fluid communication with said partitions for directing fluid feces into said basin.

13. The apparatus of claim 11, wherein said bottom layer is coated with non-corrosive material and said top layer is formed from resilient material comprising synthetic grass.

14. The apparatus of claim 11, further comprising: a plurality of elongated fastening members having opposed end portions secured to said housing and removably connectable to said basin wherein one said end portions having a substantially arcuate shape for hooking beneath said flange portions respectively.

15. The apparatus of claim 11, wherein said bottom layer has opposed end corners defining a plurality of passageways for channeling fluid feces distally from the axis.

* * * * *